Sept. 26, 1950 H. M. GRAHAM 2,523,990
HEAT EXCHANGER
Filed March 21, 1946 3 Sheets-Sheet 1
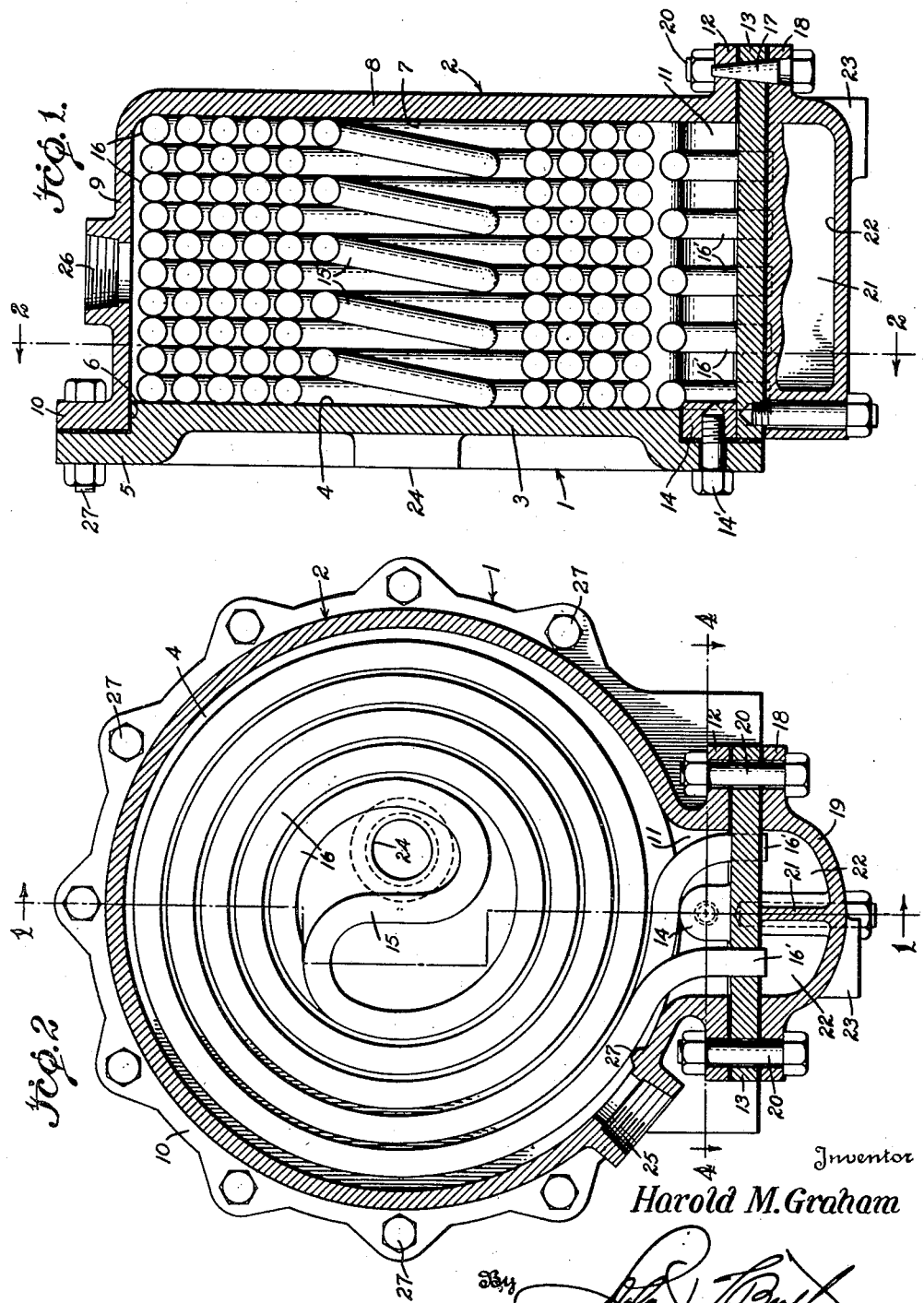
Inventor
Harold M. Graham
By
Attorney Sept. 26, 1950  H. M. GRAHAM  2,523,990
HEAT EXCHANGER
Filed March 21, 1946  3 Sheets-Sheet 2

Inventor
Harold M. Graham
By
Attorney

Sept. 26, 1950 H. M. GRAHAM 2,523,990
HEAT EXCHANGER
Filed March 21, 1946 3 Sheets-Sheet 3

INVENTOR
Harold M. Graham
BY
ATTORNEY

Patented Sept. 26, 1950

2,523,990

UNITED STATES PATENT OFFICE 2,523,990

HEAT EXCHANGER

Harold M. Graham, Kenmore, N. Y.

Application March 21, 1946, Serial No. 655,913

7 Claims. (Cl. 257—229)

This invention relates to improvements in heat exchangers, particularly for heat exchange between liquids.

The invention comprehends the provision of a heat exchanger that may be constructed with one or more spiral conduits having reversely spiralled opposite ends having the extremities mounted in a conduit plate to form a unit with a two part casing provided with spaced parallel smooth inner walls arranged so that in assembled relation the conduit convolutions will be inclosed and have the inner walls of the casing sections engaging opposite portions of the conduit convolutions substantially throughout their entire length between the center and the end portions to deform the conduit convolutions into abnormal shape for obtaining a pressure sealing cooperation between the casing sections and the conduit convolutions without packing.

The invention provides a heat exchanger having the casing formed of a pair of sections arranged to provide a seat for a conduit plate to which the ends of one or more conduits are secured, so arranged that the casing is capable of convenient assembly and disassembly from about the conduits and conduit plate to provide for economy in construction of the heat exchanger and convenient access to the conduit convolutions for cleaning.

The invention comprehends the provision of a heat exchanger having conduits in which the end portions at opposite sides of the center of each conduit are formed into a plurality of spiral convolutions arranged in symmetrical coincident relation one beside the other, with the opposite extremities of each conduit secured in a conduit plate for convenient assembly in a two-part casing having a seating flange for receiving the conduit plate so that it may be mounted on the casing in coincident relation and arranged in assembled relation so that a single manifold having a plurality of passages may be conveniently secured to the conduit plate for conducting fluids to and from circulation through the conduit convolutions in any desired manner. By having the conduit extremities secured in the conduit plate, the heat exchanger can be arranged to provide for circulation through one or more conduits. By plugging selected tubes, circulation through the heat exchanger can be conveniently controlled to obtain desired results.

The invention comprehends the provision of a heat exchanger in which the casing is provided with a seat for a conduit plate, and the seat and the conduit plate have complementary means for fixing the assembled position of the conduit plate on the seat of the casing to facilitate the sealing of the joints about the conduit plate and the sections of the casing in order that fluid may be circulated in the casing under substantial pressure.

The invention provides a casing formed of a supporting plate having an annular seat arranged in offset relation to a wall portion having a flat inner face to provide a shoulder for controlling the position of the cover when it is engaged on the supporting plate. The cover has a seating flange for engaging the peripheral seat on the supporting plate offset from a wall portion provided with a flat inner face arranged in spaced parallel relation to the inner face of the supporting plate. The laterally extending peripheral flange on the wall portion of the cover carries the seating flange on the free edge thereof and at one portion of its periphery is provided with a conduit opening having a seating flange formed about the opening to receive and mount a conduit plate arranged to close the conduit opening and with the seating flange on the cover to have sealing cooperation with the peripheral seat of the supporting plate.

In the drawings:

Fig. 1 is a vertical longitudinal cross-section through the central portion of a heat exchanger made according to the invention the conduits being shown diagrammatically, taken on line 1—1 of Fig. 2.

Fig. 2 is a cross-section taken on line 2—2 of Fig. 1.

Figure 3:
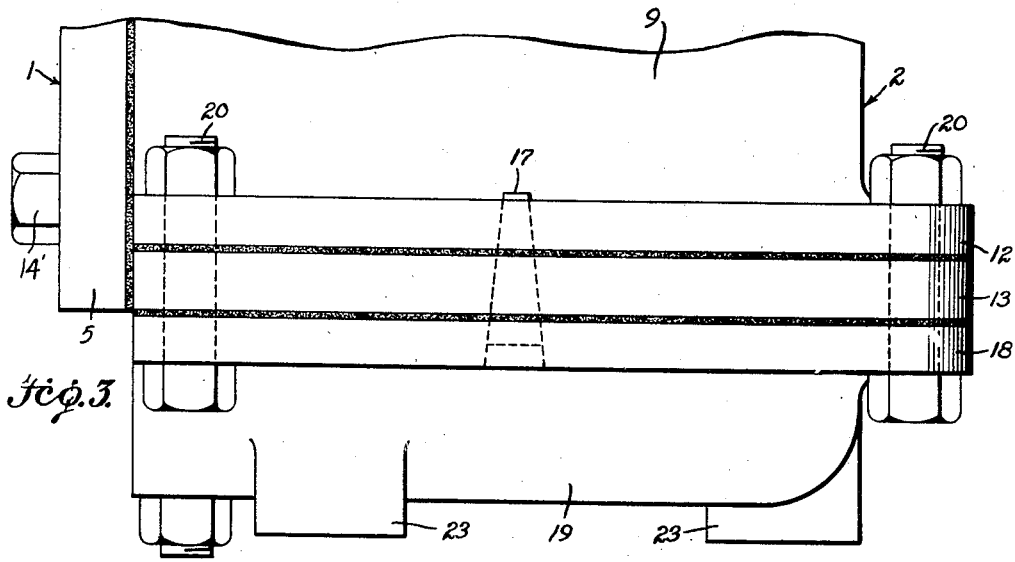
Fig. 3 shows an enlarged side elevation of the lower portion of the heat exchanger.

The heat exchanger has a two-part casing provided with a supporting plate 1 and a cover 2. Supporting plate 1 has a wall portion 3 formed with a flat smooth inner face 4. Supporting plate 1 has a peripheral seating flange 5 offset relative to wall portion 3 to provide an annular guide shoulder 6.

Cover 2 has a flat smooth inner face 7 formed on wall portion 8 arranged in spaced parallel relation to the smooth flat inner face 4 of wall portion 3. Cover 2 has a laterally extending peripheral flange 9 formed with a seating flange 10 on the free edge thereof arranged to slidably engage over shoulder 6 of supporting plate 1 for seating engagement on peripheral seating flange 5 in providing the assembled fluid-tight casing of the heat exchanger.

Figure 4:
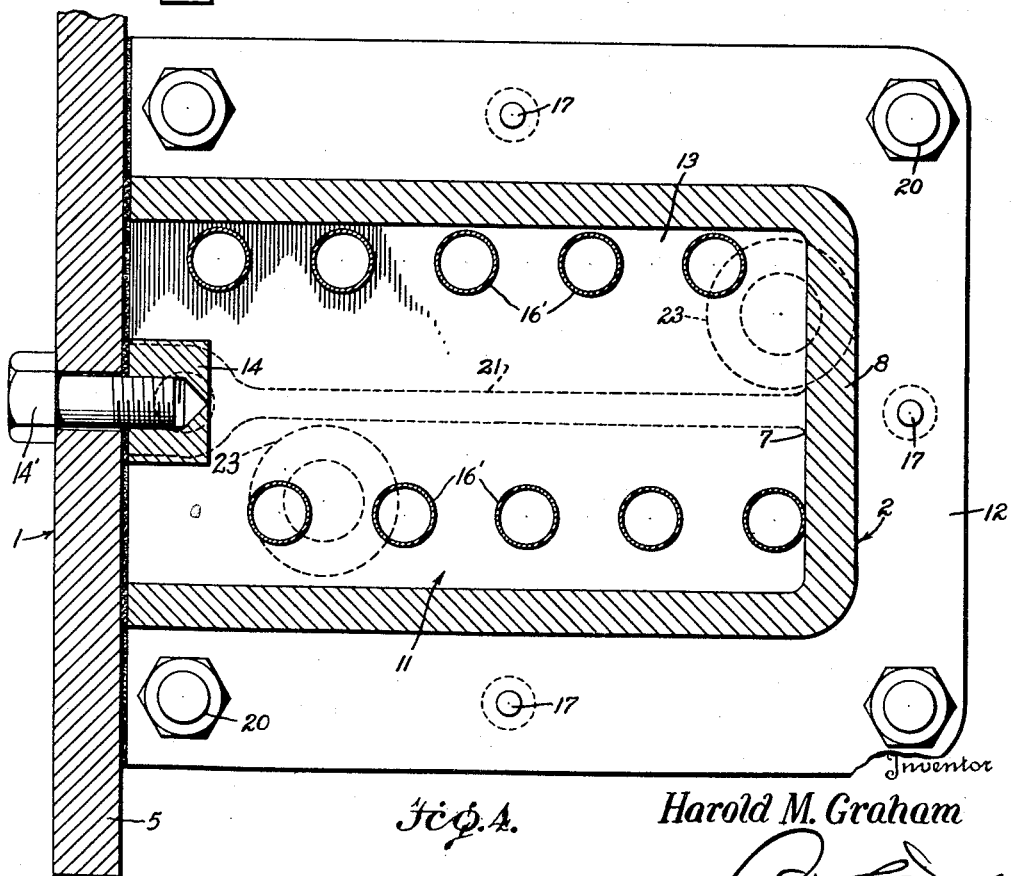
Fig. 4 is an enlarged cross-section taken on line 4—4 of Fig. 2.

Peripheral flange 9 is formed at the bottom with a conduit opening 11 extending from inner face 7 of wall portion 8 through the free edge of the flange as shown in Fig. 4. About conduit opening 11 the wall and flange portions of cover 2 are formed to provide a plate seating portion 12. A conduit plate or tube sheet 13 in the form of a rectangular flat sheet metal plate is formed to have sealing engagement on plate seating portion 12 for closing conduit opening 11. One edge of conduit plate 13 is formed to terminate in coincident relation with the face of seating flange 10 so as to form a continuation thereof and have seating engagement on peripheral seating flange 5. Conduit plate 13 has an ear 14 secured on the central marginal portion at one end to engage with seating flange 5 of supporting plate 1, as shown in Fig. 1. Ear 14 is so arranged that it will receive a threaded securing bolt 14' engaged through an opening in seating flange 5, as shown in Fig. 1. This ear has one face formed to engage seating flange 5 arranged in coincident relation with the face of seating flange 10.

One or more conduits are mounted in the heat exchanger. Each conduit is formed from a length of suitable pipe that is cylindrical in cross-section, as illustrated in the drawing, but may be of any other convenient shape that will perform the results herein described. Each length of conduit used with the present heat exchanger has the center portion 15 arranged to lie in the central portion of the casing when the conduit is assembled in the casing. Each conduit has opposite end portions curved from the central portion to form a plurality of spiral convolutions 16 arranged so that the spiral convolutions of one end portion of each conduit are offset to lie adjacent the spiral convolutions of the opposite end. The spiral convolutions of both ends of each conduit are formed so that throughout the major portion of their length they are in symmetrical coaxial and coincident relation and lie side by side in parallel planes for cooperation to form a spiral passage between the convolutions from the center to the outer portion thereof.

Figure 8:
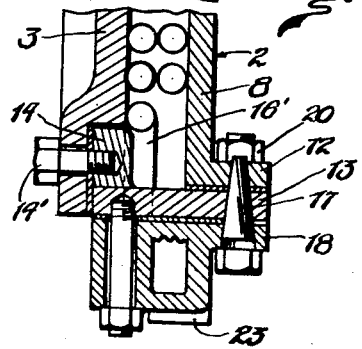
Fig. 8 is a cross-section similar to Fig. 1, with portions broken away, illustrating a heat exchanger having a single conduit between the wall portions of the casing.

The portion of each conduit at the center is formed at opposite sides of the center portion 15 to provide the loop formation illustrated in Fig. 2. It will be noted from the illustration in the drawings that all of the convolutions into which each end of each conduit is formed are in coincident relation. Throughout substantially the entire length of the opposite ends of each conduit, the spiral convolutions are arranged so that the surface at opposite sides of each end of the conduits will engage throughout the length of the spiral portions thereof. The extremities 16', of each conduit are formed to terminate in offset relation, as shown in Fig. 2, so they may be extended through apertures formed in conduit plate or tube sheet 13 along opposite sides of conduit opening 11. The extremities of each conduit extend through apertures in conduit plate 13 and the terminal portions of these ends are expanded in a manner well known in the art into the apertures in conduit plate 13 to rigidly secure each conduit thereto. A plurality of conduits is illustrated in the structure shown in the drawings, but it will be understood that one or more conduits may be used and the casing constructed to seal the desired number of conduits within the compartment formed in the casing when the sections are secured together in assembled relation. A construction having only a single conduit is shown in Fig. 8.

Conduit plate 13 with the assembled conduits is engaged in the cover and conduit plate 13 seated on plate seating portion 12. A plurality of locating pins 17 of tapered construction are mounted in the marginal flange 18 of manifold 19 for accurately positioning conduit plate 13 in fixed relation on seating flange 12. Suitable gaskets are used to seal the joints between conduit plate 13, seating flange 12 and marginal flange 18. Manifold 19 and conduit plate 13 are secured to plate seating portion 12 by a plurality of bolts and nuts 20. When the cover has conduit plate 13 and manifold 19 assembled thereon; seating flange 10, the free edge of conduit plate 13 and ear 14; are machined to provide a flat smooth surface on the conduit plate and seating flange lying in the same plane for effective sealing cooperation with peripheral seating flange 5 of supporting plate 1. A suitable gasket is used to seal the joints between seating flange 10, conduit plate 13 and the peripheral seating flange on supporting plate 1.

Figure 6:
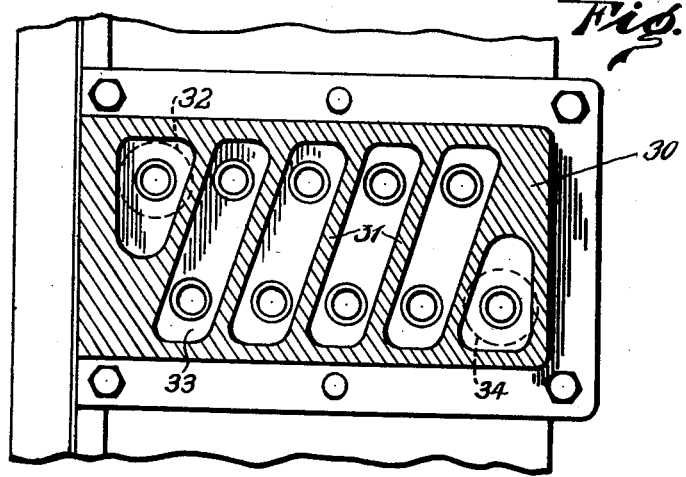
Fig. 6 is a horizontal cross-section through a modified form of manifold showing a partition arrangement in the manifold to provide a series flow through the conduits of the heat exchanger.

It will be noted that the corresponding terminals of each of the conduits secured in conduit plate 13 are arranged in aligned relation along opposite sides of the conduit plate, as shown in Fig. 2. With this arrangement of the terminal portions of the conduits in the conduit plate, manifold 19 may be formed, as shown in the drawings, to provide a partition wall 21 formed with the remaining structure of the manifold to provide a pair of longitudinally extending passages 22 in opposite sides of the manifold. Each passage communicates with corresponding terminals of the conduits in the form of the invention as disclosed in the drawings, for connecting all of the conduits in the heat exchanger for the circulation of fluid in parallel therethrough. Manifold 19 is formed to provide inlet and outlet connections at 23 so that pipes may be attached to portions 23 of the manifold for the circulation of fluid through channels 22 and through the conduits. It will be understood that any suitable arrangement of channels may be formed in manifold 19 to secure either parallel circulation of fluid through the conduits, as illustrated in the drawing, or to secure series circulation through the conduits, or a series parallel circulation therethrough. A manifold is shown in Fig. 6 at 30 having partitions 31 to provide a series flow of fluid through the conduits. A pipe connection indicated in dotted lines at 32 provides a fluid inlet connected to the manifold to convey fluid to the chamber at the left-hand end of the manifold, as shown in Fig. 6. The fluid flows into one end of a conduit communicating with said chamber. The fluid then flows through the conduit and out of the opposite end into the next chamber in the manifold, indicated at 33. The fluid passes from the lower portion of chamber 33, as shown in Fig. 6, into the upper portion and into one end of the next adjacent conduit. After passing through this second conduit it flows into the next chamber in the manifold, through the next conduit and so on in series until the fluid leaving the last conduit flows into the chamber at the right-hand end of the manifold, as shown in Fig. 6. The fluid finally flows from this right-hand end chamber into outlet pipe 34, shown in dotted lines.

Figure 7:
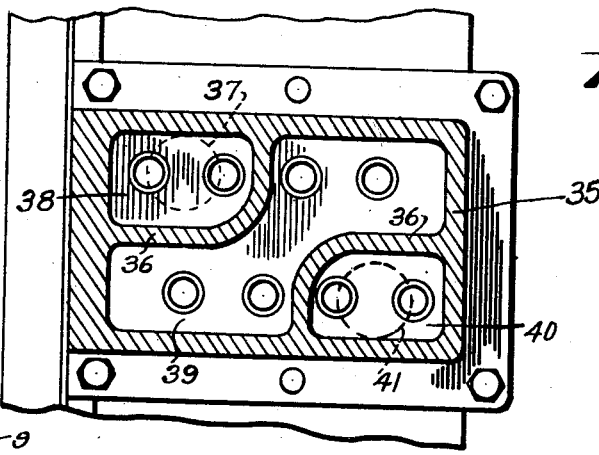
Fig. 7 is a cross-section similar to Fig. 6 showing a manifold with partitions formed to provide a series parallel connection between the conduits.

For a series parallel flow arrangement, as shown in Fig. 7, the fluid enters manifold 35 having partitions 36 through inlet pipe 37 into end chamber 38. The fluid flow is then divided and enters corresponding ends of two conduits through which it flows into chamber 39 in manifold 35. The fluid from the first two conduits then passes through chamber 39 into the next two conduits and after flowing through these last two conduits it is discharged into end chamber 40 and then to outlet pipe 41. The fluid thus flows simultaneously through two conduits in parallel between adjacent chambers in the manifold. The fluid also has a series flow arrangement between the first two conduits and the second two conduits by the arrangement of the partitions 36 in the manifold. In this way a series parallel arrangement is obtained.

The assembled casing, the conduit plate with its assembled conduits and the manifold, are assembled on supporting plate 1 by sliding the annular flange 9 onto annular guide shoulder 6 of the supporting plate so that seating flange 10 and the free edge of conduit plate 13 with ear 14 will engage peripheral seating flange 5 with a gasket between for sealing the joint. The joint is sealed between the cover, the conduit plate and supporting plate 1 by a plurality of bolts 27 that are used to draw the cover and supporting plate together under substantial pressure.

Figure 5:
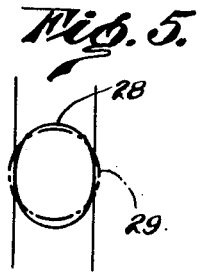
Fig. 5 is a diagram showing how a conduit is deformed in providing a direct seal in contact with other tubes and/or the cover and supporting plates.

The effective transverse dimension of peripheral flange 9 is less than the aggregate transverse dimension of all of the conduits in the casing. When the bolts 27 secure seating flange 10 against peripheral seating flange 5, all of the conduits will be deformed from their circular shape in cross-section to an oval shape of a character sufficient to engage the spiral convolutions of every tube with one another and flat inner faces 3 and 7 of the wall portions of the supporting plate and cover, for the purpose of sealing the spiral passage between the convolutions of the conduits in an effective manner. This compressed oval shape of the conduits is shown in Fig. 5 of the drawings. The solid line 28 in Fig. 5 shows the oval shape of a conduit in compressed relation in comparison with the normal circular shape in dot and dash lines 29 which may be within the elastic limits of the material used. In the other figures of the drawing the cross-section illustration of the conduits is shown in circular form for convenience in illustration. This provides for the circulation of fluid under substantial pressure outside of the conduits through the spiral passage, and yet prevents leakage between convolutions of the conduits. This sealing of the conduits with the cover and supporting plate between the flat faces is obtained without the use of packing materials thereby providing for more convenient assembly of the tube and casing sections, more convenient disassembly thereof for cleaning, and facilitates the cleaning of the casing and assembled conduits. In addition, this construction improves the efficiency of heat exchange.

The terminals of the conduits are arranged in the conduit plate in relation to the supporting plate and cover so that the conduit plate will cooperate with the cover not only in closing the conduit opening therein, but in providing for the deformation of the conduits into oval shape and the sealing of the cover on the supporting plate. The conduits thus compressed in sealed relation between the wall portions provide the circuitous path from the center portion of the casing to the outer portion thereof for the circulation of liquid or other fluids under substantial pressure. A bolt extends through the lower portion of the supporting plate, as shown in Fig. 1, and is threaded in an opening in ear 14 to further cooperate in securing the sealing of the conduit plate against the seating flange 5 of supporting plate 1.

A pair of ports 24 and 25 are provided for the circulation of fluid outside of the conduits through the casing in the spiral passage about the conduits. Port 24 is formed in the central portion of supporting plate 1 while port 25 is formed in the lower side portion of peripheral flange 9, as shown in Fig. 2. A port 26 is formed in the upper portion of the casing in flange 9 which may be used for the circulation of fluid in the casing with port 24 if desired or to provide a vent. Port 26 may be closed when its use is not desired by a suitable plug threaded therein. These ports provide for the circulation of fluid outside of the conduits through the casing in either direction through the spiral passage formed by the conduits. A rib 27, Fig. 2, on the inner surface of flange 9 provides a baffle cooperating with the outer end portions of the outer convolutions of the conduits in assembled relation in the casing to cooperate in arresting the flow of fluid for direction to port 25. It is obvious from the disclosure in the drawing that port 24 may be provided in the central portion of wall portion 2 of the cover instead of in the supporting plate should this be desired.

Figure 9:
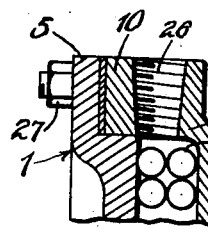
Fig. 9 is an enlarged detail cross-section through one end of a conduit in the conduit plate showing how a plug may be inserted in a conduit to prevent fluid flow therein.

The heat exchanger herein disclosed eliminates all soldered and brazed connections for the conduits in providing for communication thereof with a manifold and provides a conduit plate in which the terminal portions of the conduits are all secured in a single conduit plate by expanding the ends of the tubes into the apertures in the conduit plate in a manner well known in the art. It will be understood that with a heat exchanger of the character illustrated and described herein, the manifold may have any desired arrangement of channels formed therein to obtain any desired combination of connections for fluid flow through the conduits, without departing from the spirit and scope of the invention as disclosed herein. In addition, if it is not desired to secure circulation through all of the conduits in a heat exchanger constructed as disclosed herein, one or more of the conduits may have plugs, see Fig. 9, inserted into the terminal portion secured in the conduit plate to eliminate flow therein in a manner well-known in the art. The plugging of a tube as shown in Fig. 9, consists in inserting a plug 42 in the open end 16' of a conduit where it is secured in tube plate 13. Plug 42 is inserted into the open tube end and firmly and tightly driven into the tube end to completely close the tube end.

The locating pins 17 hereinabove described provide for the accurate reassembly of the conduit plate on seating flange 12 of the cover whenever the conduit plate and cover are disassembled so that upon reassembly the conduit plate is always located accurately on the cover to reseal the cover and conduit plate on the seating flange of the supporting plate in an effective manner so that fluid under substantial pressure may be circulated outside of the conduits as well as through the conduits.

This heat exchanger provides a structural arrangement of casing parts and conduits with a single conduit plate supporting all of the conduits and having both ends of each conduit secured thereto, for the purpose of securing a structure that is more economical to manufacture and assemble, and a heat exchanger that is less expensive to clean and repair than the heat exchangers that have been heretofore used. Conduits can also be easily replaced in the conduit plate in a most efficient and economical manner and heat exchangers constructed as disclosed herein are found to have a substantially high degree of efficiency in heat exchange for the size of the assembled unit.

The invention claimed is:

1. A heat exchanger comprising a casing having a pair of spaced parallel wall portions formed with flat inner faces, peripheral flange means joining the peripheries of said wall portions, said wall portions and flange means at one portion of the periphery of said casing being formed with a conduit opening between said wall portions and a seat portion about said opening, a tube sheet mounted on said seat portion over said opening in normal relation to and at the periphery of said wall portions, a plurality of conduits having opposite extremities extending through said conduit opening and apertures in said tube sheet and secured to said tube sheet, each conduit having opposite end portions formed into symmetrical convolute spirals arranged in coaxial parallel relation in said casing for engagement of said spirals with each other and said flat faces of said wall portions for cooperative sealing engagement throughout substantially the entire length of said conduits between the central portion and said extremities, said flange means and tube sheet having an effective dimension between said flat inner faces of said wall portions less than the aggregate transverse dimension of said plurality of conduits between said wall portions, means for securing said casing parts in assembled relation and for compressing and deforming said conduits into abnormal shape under substantial pressure for effectively sealing the contact between said conduits and wall portions to provide a spiral passage in said casing outside of said spirals, and means for connecting each conduit for fluid circulation therein and the interior of said casing outside said conduits for independent fluid circulation.

2. A heat exchanger comprising casing sections having a pair of spaced parallel wall portions formed with flat inner faces, peripheral flange means joining the peripheries of said wall portions, said wall portions and flange means at one portion of the periphery of said casing being formed with a conduit opening between said wall portions and a seat portion about said opening, a conduit plate mounted on said seat portion normal to said wall portions and closing said opening, a plurality of conduits having opposite extremities extending through said conduit opening and secured in apertures in said conduit plate, each conduit having the portions between the center and opposite ends formed into parallel coaxial symmetrical spirals engaged throughout the spiral portions with one another and said flat inner faces in cooperative sealing engagement throughout the length of said spiral portions to form a spiral passage thereabout in said casing, a manifold mounted on the outer face of said conduit plate having a plurality of channels opening toward said conduit plate communicating selectively with opposite ends of each conduit for conducting fluid to and from said conduits in cooperation with said conduit plate, means securing said manifold and conduit plate to said seat portion in fluid tight relation, means extending transversely to said wall portions securing said sections and a margin of said conduit plate in assembled relation, and ports in said casing for circulating fluid through said spiral passage outside of said conduits.

3. A heat exchanger comprising a casing having a pair of spaced parallel wall portions formed with flat inner faces, peripheral flange means joining the peripheries of said wall portions, said wall portions and flange means at one portion of the periphery of said casing being formed with a conduit opening between said wall portions and a seat portion about said opening, a flat sheet metal plate mounted on said seat portion and closing said opening, a plurality of conduits having opposite extremities extending through said conduit opening in the same direction parallel to said wall portions and secured in apertures in said plate, each conduit having the portions between said extremities coiled within said casing, a manifold having a flat seat portion on one side mounted on said plate and also having a plurality of channels opening through said side and communicating selectively with opposite ends of each conduit for conducting fluid to and from said conduits in circulation therethrough, means securing said manifold and plate to said seat portion in fluid tight relation, and ports in said casing for circulating fluid therein about said conduits.

4. A heat exchanger comprising a supporting plate having a peripheral seat, a cover having a plate portion in spaced parallel relation to said supporting plate and a peripheral flange extending laterally from said plate portion, a seating flange on the free edge of said peripheral flange for engaging said peripheral seat of said supporting plate, said peripheral flange at one portion of the periphery of said cover having a section removed to form a conduit opening between said plate portion and said supporting plate and said cover having a seat portion formed about said opening, a conduit plate mounted in perpendicular relation to said supporting plate on said seat portion and closing said opening, a plurality of conduits having opposite extremities extending through said conduit opening and secured in apertures in said conduit plate, each conduit having the portions between said extremities coiled within said casing, a manifold mounted on the outer face of said conduit plate having a plurality of channels opening against said plate and communicating selectively with opposite ends of each conduit for conducting fluid to and from said conduits in circulation therethrough, means securing said manifold and conduit plate to said seat portion in fluid tight relation, said conduit plate having a peripheral portion for seating engagement in edgewise relation with said peripheral seat on said supporting plate, and means securing said cover and conduit plate to said supporting plate with said seating flange and peripheral portion of said conduit plate engaging said peripheral seat in fluid tight relation.

5. A heat exchanger comprising a supporting plate having a peripheral seat, a cover having a plate portion in spaced parallel relation to said supporting plate and a peripheral flange extending laterally from said plate portion, a seating flange on the free edge of said peripheral flange for engaging said peripheral seat of said supporting plate, said plate portion and peripheral flange at one portion of the periphery of said cover being formed with a conduit opening between said wall portion and said supporting plate and a seat portion formed on said flange and wall portion about said opening, a flat tube sheet mounted on said seat portion in perpendicular relation to said wall portion and closing said opening, a plurality of conduits having opposite extremities extending through said conduit opening parallel to said wall portion and secured in apertures in said tube sheet, each conduit having the portions between said extremities coiled within said casing in spiral relation parallel to said plate portion, a manifold mounted on said tube sheet having a plurality of channels opening through one side against the outer side of said tube sheet and communicating selectively with opposite ends of each conduit for conducting fluid to and from said conduits in circulation therethrough, aligning means having complementary parts on said seat portion and tube sheet for aligning said tube sheet in fixed relation in assembled position on said cover, means securing said manifold and tube sheet to said seat portion in fluid tight relation, said tube sheet having a peripheral portion for seating engagement with said peripheral seat on said supporting plate accurately positioned by said aligning means with said seating flange, and means securing said cover and tube sheet to said supporting plate with said seating flange and peripheral portion of said tube sheet engaging said peripheral seat in fluid tight relation.

6. A heat exchanger comprising a supporting plate having a peripheral seat, a cover having a plate portion in spaced parallel relation to said supporting plate and a peripheral flange extending laterally from said plate portion, a seating flange on the free edge of said peripheral flange for engaging said peripheral seat of said supporting plate, said plate portion and peripheral flange at one portion of the periphery of said cover being formed with a conduit opening between said plate portion and said supporting plate and a seat portion about said opening, a flat sheet metal conduit plate mounted on said seat portion and closing said opening, one or more conduits having opposite extremities extending through said conduit opening and secured in apertures in said conduit plate, each conduit having the portions between the center and opposite ends formed into parallel coaxial symmetrical spirals engaged throughout the spiral portions with one another and the inner faces of said supporting plate and plate portion of said cover in cooperative sealing engagement throughout the length of said spiral portions to form a spiral passage thereabout in said casing, a manifold detachably mounted on the outer side of said conduit plate having a plurality of channels opening through one side communicating with the outer face of said conduit plate and selectively with opposite ends of each conduit for conducting fluid to and from said conduits in circulation therethrough, means securing said manifold and conduit plate to said seat portion in fluid tight relation, said conduit plate having a peripheral portion for seating engagement with said peripheral seat on said supporting plate and means securing said cover and conduit plate to said supporting plate with said seating flange and peripheral portion of said conduit plate engaging said peripheral seat in fluid tight relation.

7. A heat exchanger comprising a supporting plate having an offset radial peripheral seat and a positioning shoulder adjacent said seat, a cover having a plate portion in spaced parallel relation to said supporting plate and a peripheral flange extending laterally from said plate portion, a radial seating flange on the free edge of said peripheral flange for engaging said peripheral seat on said supporting plate, said peripheral flange slidably engaging said positioning shoulder for centering said cover in assembled relaton on said supporting plate, said supporting plate and plate portion having smooth flat inner faces in parallel relation, said peripheral flange and plate portion having a conduit opening formed therein opening through the free edge of said flange, a seat portion formed on said peripheral flange at opposite sides of said conduit opening and on said plate portion at one end thereof, a flat sheet metal plate in perpendicular relation to said plate portion having the marginal portions at opposite sides and one end engaged with said seat portion, the opposite end of said plate having edgewise engagement with said offset radial seat, said plate having a plurality of spaced apertures formed therein, a plurality of conduits having opposite extremities extending in the same direction through said conduit opening and rigidly secured to said plate in said spaced apertures, each conduit having opposite end portions formed into symmetrical convolute spirals in coaxial parallel relation in said casing for engagement of said spirals with each other and said flat inner faces for cooperative sealing engagement throughout substantially the entire length of said conduits between the central portion and said extremities, said peripheral flange and flat plate having an effective dimension between said flat inner faces less than the aggregate transverse dimension of said conduits, a manifold on the outside of said flat plate having a flat surface on one side engaging said flat plate and formed with a plurality of channels opening through said side against said plate and selectively communicating with the ends of said conduits for circulating fluid therein, means securing said manifold and plate to said seat on said cover, tapered pins engaging in tapered apertures in said seat, plate and manifold for aligning the free end of said plate with said radial seating flange in coincident relation, and means securing said radial seating flange to said peripheral seat on said supporting plate and the edge of said plate against said peripheral seat in fluid tight relation and simultaneously compressing and deforming said conduits into abnormal shape under substantial pressure for effectively sealing the contact between said conduits and wall portions to provide a spiral passage about said conduit between said supporting plate and plate portion with said peripheral flange.

HAROLD M. GRAHAM.

REFERENCES CITED

The following references are of record in the file of this patent:

UNITED STATES PATENTS

| Number | Name | Date |
|---|---|---|
| 725,737 | Marrder | Apr. 21, 1903 |
| 1,439,988 | Anderson | Dec. 26, 1922 |
| 1,779,890 | Rathbun | Oct. 28, 1930 |
| 2,129,300 | Bichowsky | Sept. 6, 1938 |

FOREIGN PATENTS

| Number | Country | Date |
|---|---|---|
| 14,641 of 1897 | Great Britain | June 17, 1897 |
| 467,844 | Great Britain | June 24, 1937 |